(No Model.)
D. C. PECK & F. L. GAYLORD.
MIRROR PIVOT.
No. 299,005. Patented May 20, 1884.
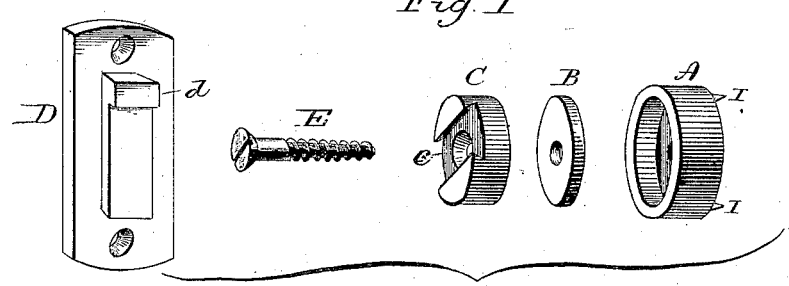
Fig. 1
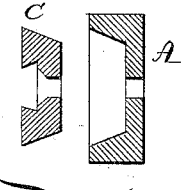
Fig. 4
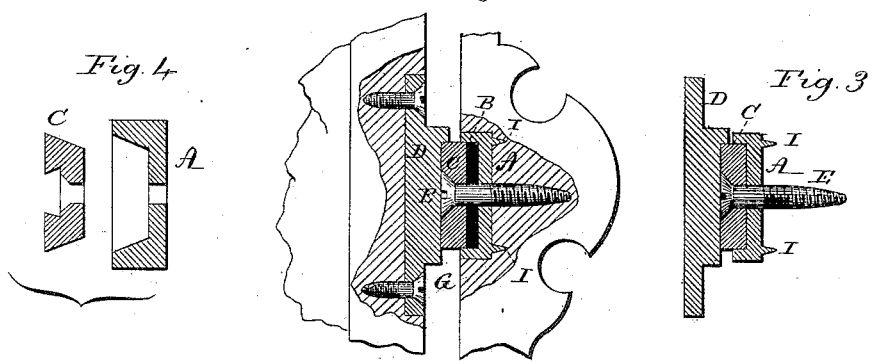
Fig. 2
Fig. 3
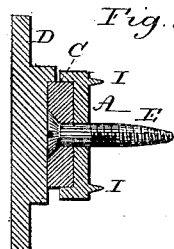
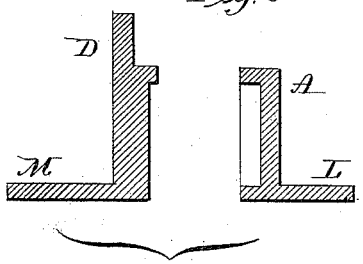
Fig. 5
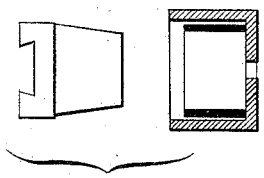
Fig. 6
Witnesses.
Don. C. Peck
Fred'k L. Gaylord
Inventors
By Atty

UNITED STATES PATENT OFFICE.

DON C. PECK AND FREDERICK L. GAYLORD, OF ANSONIA, CONNECTICUT.

MIRROR-PIVOT.

SPECIFICATION forming part of Letters Patent No. 299,005, dated May 20, 1884.

Application filed February 23, 1884. (No model.)

*To all whom it may concern:*

Be it known that we, DON C. PECK and FREDERICK L. GAYLORD, of Ansonia, in the county of New Haven and State of Connecticut, have invented new Improvements in Mirror-Pivots; and we do hereby declare the following, when taken in connection with accompanying drawings and the letters of reference marked thereon, to be a full, clear, and exact description of the same, and which said drawings constitute part of this specification, and represent, in—

Figure 1, a perspective view of the parts detached; Fig. 2, a sectional view as attached to a mirror; Figs. 3, 4, 5, and 6, modifications.

This invention relates to an improvement in pivots for hanging mirrors and for like purposes—such as transoms, &c.—so that they may be held at any desirable inclination; the object being to make the pivots so that the friction can be readily increased or diminished, according to the weight of the mirror to be hung, and also that the mirror may be readily removed or introduced; and it consists in the construction as hereinafter described, and particularly recited in the claims.

A represents a cup-shaped metal socket; B, a thin rubber or flexible material or spring disk, in shape corresponding to, but less in depth than, the recess in the socket, so as to fit closely therein; C, a metal disk, in shape also corresponding to the recess in the socket, but so as to revolve freely therein, the said disk constructed with a dovetail-shaped groove, *c*, diametrically across its face; D, a plate having a dovetail-shaped rib, *d*, on its surface corresponding to the groove in the disk C, as seen in Fig. 1, the rib constructed with a shoulder, F, on its face near one end.

To attach the pivot, bore a hole in each post or support G at the point it is desired to place the pivot, the diameter being just sufficient to admit the socket A. Set a socket into each hole, place a disk, B, then a disk, C, into each socket, the groove outward. Then introduce a screw, E, through the opening in the center of the disks and socket and drive it into the posts until the disks B and C and socket A are drawn together to cause sufficient friction upon the disk C to hold the mirror at any desired inclination. A plate, D, is attached to each side the mirror-frame at a point corresponding to the socket. To introduce the mirror, set the rib *d* on the plates D into the groove *c* in the disks C until the shoulder F comes to a bearing on the disk C, as seen in Fig. 2. The disks C, being now connected to the plates D, act as trunnions, upon which the mirror turns, as seen in Fig. 2. After time and wear, or whenever the friction is not sufficient to hold the mirror, it may be increased by simply turning the screw into the post, or vice versa, to diminish the friction.

The elastic or flexible disk B may be dispensed with, the surface of the disk C being then drawn by the screw E against the bottom of the socket, to cause sufficient friction for holding the mirror, as seen in Fig. 3.

In order to prevent the socket A from turning in the post in which it is placed, we form one or more projections, I, on the back of the socket, which enter the post and prevent any rotation of the socket.

This pivot may be made very cheaply, the parts A, C, and D being made from cast metal, E, an ordinary wood-screw, and the disk B, if used, cut from sheet-rubber or other suitable material, and all can be readily put together and secured to their respective parts.

Instead of making the recess in the socket of an equal diameter throughout, as shown, it may be conical, as seen in Fig. 4, and the disk C of corresponding shape, the conical surfaces increasing the friction as their parts are drawn together.

Instead of making the friction-spring a disk of india-rubber, it may be in tubular shape, the disk C constructed with a tapering shank to enter the tube, as seen in Fig. 6, and so that as the disk C is forced inward it will expand the tube and increase the friction.

In some cases it is desirable to attach the pivot to the back of the post and frame. In that case the socket is provided with a flange, L, and the plate D with a corresponding flange, M, as seen in Fig. 5. In this construction, instead of the adjusting-screw being driven into the wood of the frame or post, the socket is concentrically drilled and tapped to receive the screw, as seen in Fig. 5.

We claim—

1. The combination of the metal socket A, disk C, having a dovetail-shaped groove, *c*, diametrically across its face, with screw E, and plate D, having a dovetail-shaped rib, *d*, on its face corresponding to the groove *c*, substantially as and for the purpose specified.

2. The combination of the metal socket A, disk C, having a dovetail-shaped groove, *c*, diametrically across its face, and a spring-disk, B, between the socket A and disk C, with screw E, and plate D, having a dovetail-shaped rib, *d*, on its face corresponding to the groove *c*, substantially as and for the purpose specified.

DON C. PECK.
          FREDK. L. GAYLORD.

Witnesses:
  CHAS. F. KUCH,
  W. C. BARCLAY.